United States Patent
Duguay et al.

(10) Patent No.: US 6,874,047 B1
(45) Date of Patent: Mar. 29, 2005

(54) SYSTEM AND METHOD FOR IMPLEMENTING AN SMBUS/I²C INTERFACE ON A NETWORK INTERFACE CARD

(75) Inventors: Christopher J. Duguay, Winchendon, MA (US); Robert Reissfelder, Westwood, MA (US); Robert F. Turnbull, Watertown, MA (US); Michael K. Brown, Salem, NH (US)

(73) Assignee: 3Com Corporation, Santa Clara, CA (US)

( * ) Notice: Subject to any disclaimer, the term of this patent is extended or adjusted under 35 U.S.C. 154(b) by 245 days.

(21) Appl. No.: 09/591,044

(22) Filed: Jun. 9, 2000

(51) Int. Cl.[7] .............................................. G06F 13/00
(52) U.S. Cl. ....................................... 710/100; 713/600
(58) Field of Search ........................... 710/100, 14, 60, 710/126, 107, 102; 713/600, 400; 315/317; 364/200

(56) References Cited

U.S. PATENT DOCUMENTS

| | | | | |
|---|---|---|---|---|
| 4,443,845 A | * | 4/1984 | Hamilton et al. | 710/300 |
| 5,671,400 A | * | 9/1997 | Kiggens et al. | 703/23 |
| 5,920,156 A | * | 7/1999 | Carson et al. | 315/292 |
| 5,925,135 A | * | 7/1999 | Trieu et al. | 713/400 |
| 5,935,232 A | * | 8/1999 | Lambrecht et al. | 710/315 |
| 6,173,350 B1 | * | 1/2001 | Hudson et al. | 710/100 |
| 6,209,022 B1 | * | 3/2001 | Sotek et al. | 709/209 |
| 6,526,518 B1 | * | 2/2003 | Catlin et al. | 713/501 |
| 6,625,743 B1 | * | 9/2003 | Gulick | 713/400 |

* cited by examiner

Primary Examiner—Tim Vo
Assistant Examiner—Kim T. Huynh
(74) Attorney, Agent, or Firm—Weingarten, Schurgin, Gagnebin & Lebovici LLP

(57) ABSTRACT

A system and method for implementing an SMBus/I²C interface in a computer connectable to a network. The system includes a plurality of devices communicably coupled to an SMBus. The system operates at a first clock rate when the system is awake, and at a second clock rate less than the first clock rate when the system is sleeping. At least when the system is sleeping, a first device stores data transferred via the SMBus in a register, and a second device drives the clock line of the SMBus to a low logic level while the data is stored in the register of the first device. Upon completion of the data transfer operation, the first device clears the data from the register, and the second device releases the clock line to allow it to be pulled-up by pull-up circuitry connected to the SMBus.

6 Claims, 7 Drawing Sheets

SYSTEM AND METHOD FOR IMPLEMENTING AN SMBUS/I²C INTERFACE ON A NETWORK INTERFACE CARD

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to network computing systems, and more specifically to systems and techniques for implementing an SMBus/I²C interface in a network computing system.

The System Management Bus (SMBus) is an industry standard bus that was originally developed for use in portable computers powered by a smart battery. For example, using the SMBus, intelligent charging circuitry may communicate with the smart battery to control the charging of the battery, and a processor included in the portable computer may communicate with the smart battery to determine the amount of charge on the battery. Accordingly, the SMBus provides a simple and inexpensive way for a smart battery in a portable computer to communicate with the rest of the computing system.

In recent years, the SMBus has also been used in AC-powered computers. This is because such computers have increasingly incorporated power management functions to enhance energy efficiency, and the SMBus provides a standard way to control and access information from power-related and other devices included in these computers during the execution of power management functions.

Generally, the SMBus is a 2-wire interface comprising an SCL line, upon which a clock signal is provided, and an SDA line, upon which a digital data signal is provided. Further, the SMBus uses the Inter-Integrated Circuit (I²C) bus communication protocol to pass commands and messages between "master" and "slave" devices on the 2-wire bus.

For example, FIG. 1 depicts a Read Byte Protocol (RBP) 100, which conforms to the SMBus specification. In the first byte of the RBP 100, i.e., a start condition 102 followed by a slave address 104, a master device asserts the address of a slave device on the bus, and then follows the slave address 104 with a write bit 106. Next, the slave device asserts an acknowledge bit 108 on the bus. The master device then delivers a byte-long command code 110, which is followed by another acknowledge bit 112 asserted by the slave device. In the next byte of the RBP 100, i.e., a start condition 114 followed by a slave address 116, the master device again asserts the address of the slave device, and then follows the slave address 116 with a read bit 118. This denotes a read operation from the address of the slave device. Next, the slave device asserts another acknowledge bit 120 and then returns a data byte 122. Finally, the master device asserts a not-acknowledge bit 124 to signify the end of the read operation and stop condition 126 to finish the transaction.

FIG. 2 is a timing diagram depicting signals on the SCL and SDA lines during execution of the above-described read-byte transaction. Specifically, FIG. 2 depicts a start condition at time T1 corresponding to, e.g., the start condition 114, that comprises a high-to-low logic level transition of the SDA line while the SCL line is at a high logic level; and, a stop condition at time T6 corresponding to, e.g., the stop condition 126, that comprises a low-to-high logic level transition of the SDA line while the SCL line is at the high logic level. FIG. 2 also depicts, between times T2 and T5, at least a portion of the data byte 122 (see FIG. 1) asserted by the slave device on the SDA line. In accordance with the SMBus specification, that portion of the data byte 122 changes state only when the SCL line is low, e.g., at times T2 and T5, and is stable and valid for the read operation between times T3 and T4 when the SCL line is high.

Although the SMBus has been successfully used for enabling communications with a smart battery in a portable computer, the SMBus has drawbacks when used in AC-powered computers that execute power management functions, i.e., when such computers are "sleeping." For example, according to the SMBus specification, the minimum high period of the clock sign al on the SCL line is specified as 4.0 $\mu$s. For high speed computing systems that utilize such a clock signal, this means that the read operation performed between the times T3 and T4, as depicted in FIG. 2, must be completed within 4.0 $\mu$s. However, this timing constraint can be problematic, especially in computers that are sleeping.

For example, when a computer is sleeping, it may be in a suspended power state in which all power is removed except for that required to maintain the current operational state in memory. Further, in a networked computer that is sleeping, power may also be maintained to at least a portion of a network interface card incorporated therein. Moreover, the clock frequency of a processor may be reduced in a computer that is sleeping to further reduce power consumption in this mode.

Although the clock frequency of a processor operating under normal conditions may be sufficient to enable that processor to complete the above-described read operation within the requisite period of 4 $\mu$s, a computer that is sleeping with a reduced clock frequency maybe incapable of completing such a read operation on the SMBus. Further, such sleeping computers may be incapable of completing other operations as well as the read operation on the SMBus during minimum periods of the clock signal.

It would therefore be desirable to have improved systems and techniques for implementing an SMBus/I²C interface in a computer that executes power management functions. Such systems and techniques would enable a computer to successfully complete operations via the SMBus whether or not the computer is sleeping. It would also be desirable to have such system and techniques that can be easily implemented in a networked computing system.

BRIEF SUMMARY OF THE INVENTION

In accordance with the present invention, a system and method are disclosed for implementing an SMBus/I²C interface in a computer capable of executing power management functions. Specifically, the disclosed system and method enable the computer to transfer data via the SMBus whether or not the computer is sleeping. Such data transfer is accomplished by providing a register coupled to the SMBus for storing at least a portion of the data during a, data transfer operation, and a pull-down switch for extending the low period of a clock signal to synchronize the data transfer operation with the speeds of devices involved in the data transfer.

In one embodiment, a system is provided for transferring data between a plurality of devices communicably coupled to a bus. The bus includes at least one data line for transmitting the data and at least one clock line. Further, the system is operative at a first clock rate and at a second clock rate that is less than the first clock rate. The system includes a first device communicably coupled to the bus and operative at least at the second clock rate to store at least a portion of the data in a register; and, a second device communicably coupled to the bus and operative at least at the second clock rate to drive the clock line to a low logic level while the data is stored in the register of the first device.

In the foregoing system, data-can be transferred via an SMBus when the system is operative at the first clock rate, i.e., the system is awake; and, when the system is operative at the second reduced clock rate, i.e., the system is sleeping. Moreover, data can be successfully transferred via the SMBus even if the clock signal transmitted by the SMBus has a minimum high period, whether or not the overall system is sleeping.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
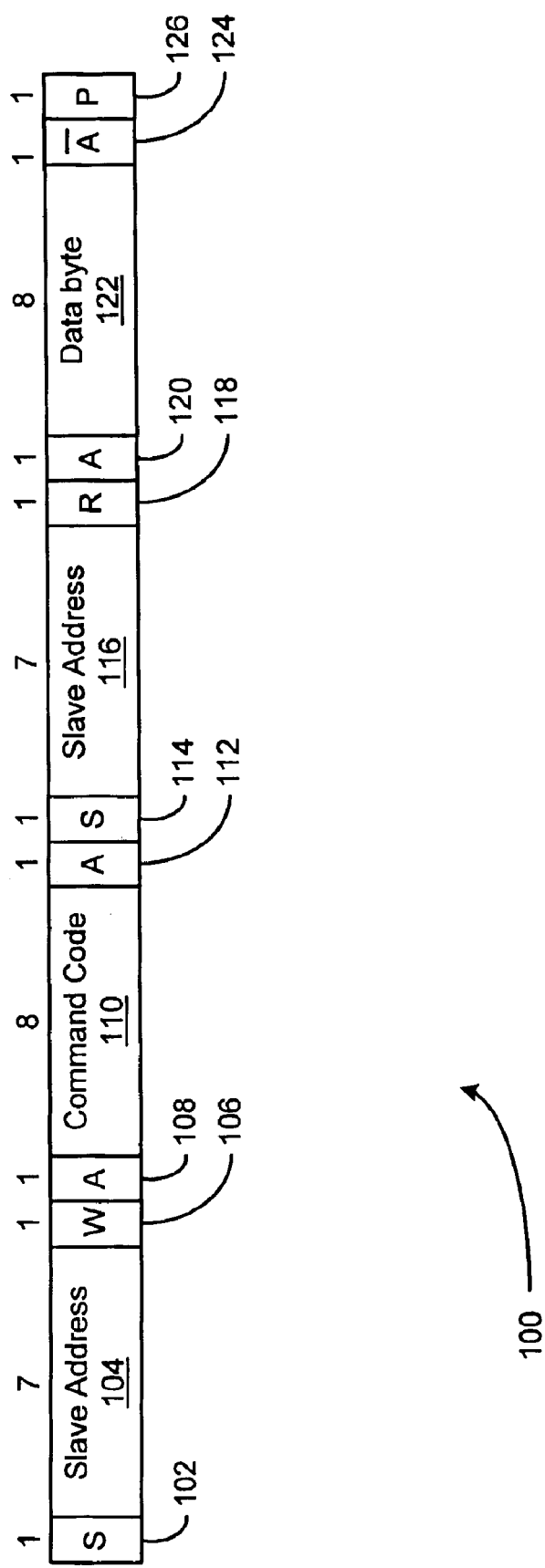
FIG. 1 is the standard Read Byte Protocol used for implementing a read-byte transaction on the SMBus.
Figure 2:
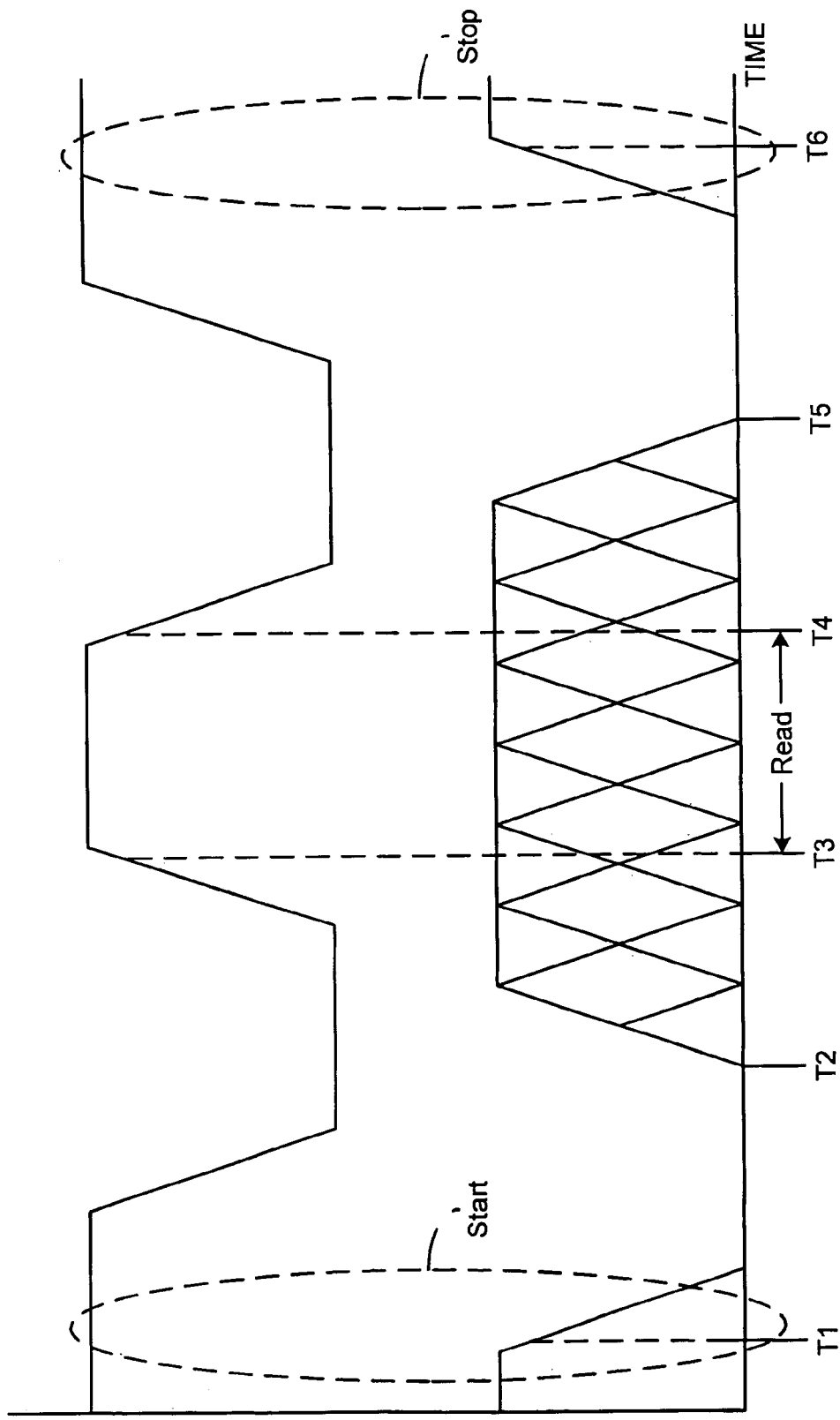
FIG. 2 is a timing diagram illustrating signals on the SCL and SDA lines of the SMBus during execution of the read-byte transaction defined in FIG. 1.
Figure 3:
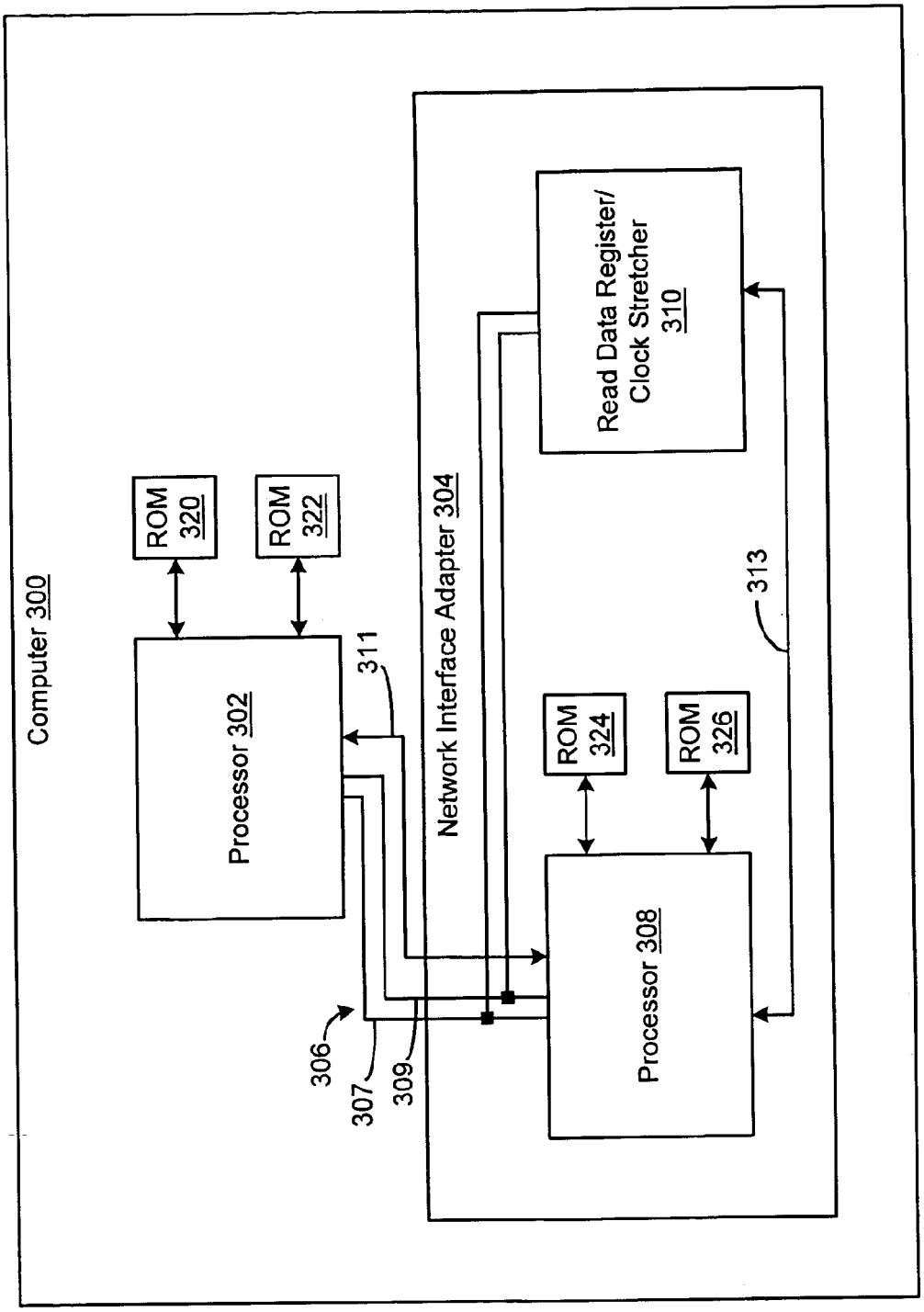
FIG. 3 is a block diagram illustrating a computer implementing the SMBus and operative in accordance with the present invention.

FIG. 3 depicts an illustrative embodiment of a computer 300 that is operative in accordance with the present invention. In this illustrative embodiment, the computer 300 may comprise a Personal Computer (PC), a workstation, or any other computerized device communicably connectable to a network. Specifically, the computer 300 includes a network interface adapter 304, which in a preferred embodiment is implemented on at least one network interface card (NIC) of the computer 300. Alternatively, the network adapter 304 may be integrated with the logic of the computer 300.

More specifically, the network adapter 304 includes a network interface that comprises conventional circuitry and connectors to provide for coupling the network adapter 304 to a network. The network adapter 304 further includes at least one memory such as a ROM 324 and a RAM 326, and at least one processor 308 for executing programs stored in the memory, including applications for establishing a communication link with the network, for transmitting and receiving data packets over the network, and for processing the data packets. Moreover, the network adapter 304 includes a read-data register/clock stretcher 310, which is communicably connected to the processor 308 via a bus 313.

The computer 300 further includes at least one host memory such as a ROM 320 and a RAM 322, and at least one host processor 302 for executing programs stored in the host memory. In this illustrative embodiment, the programs stored in the host memory include a power management application for powering-down at least a portion of the computer 300, e.g., when the computer 300 is not in use for an extended time, and for restoring full-power to the computer 300 when it is required for use.

As depicted in FIG. 3, a system bus 311 communicably interconnects the host processor 302 and the processor 308 of the network adapter 304. It should be appreciated that the system bus 311 comprises conventional data, address, and control busses required for communicably interconnecting the host processor 302 with the network adapter 304.

An SMBus 306, which includes an SCL line 307 and an SDA line 309, also communicably interconnects the host processor 302 with the network adapter 304. In a preferred embodiment, the SMBus 306 conforms to the System Management Bus Specification, Revision 1.1, which is incorporated herein by reference. Specifically, the SCL line 307 and the SDA line 309 of the SMBus 306 provide a 2-wire interface through which devices, e.g., the read-data register/clock stretcher 310 and power-related devices, of the computer 300 can communicate with the rest of the network computing system.

Those of ordinary skill in the art will appreciate that there are two (2) types of devices that can communicate via the SMBus 306, i.e., "master devices" and "slave devices." Specifically, a master device issues commands and terminates transfers on the SDA line 309, and generates clock signals on the SCL line 307; and, a slave device receives or responds to commands on the SDA line 309. Further, during operation of the computer 300, each device on the SMBus 306 may at least temporarily take on the role of a master device and at other times take on the role of a slave device. Moreover, each master and slave device on the SMBus 306 has a unique address, which is typically seven (7) bits long with a read/write bit appended in bit position 0. For example, after a master device issues a command on the SDA line 309 using the unique address of a slave device, the slave device detecting its unique address then responds to the rest of the command. It will also be appreciated that the computer 300 includes other conventional computer components that are not explicitly depicted in FIG. 3 such as an interrupt controller.

Figure 4:
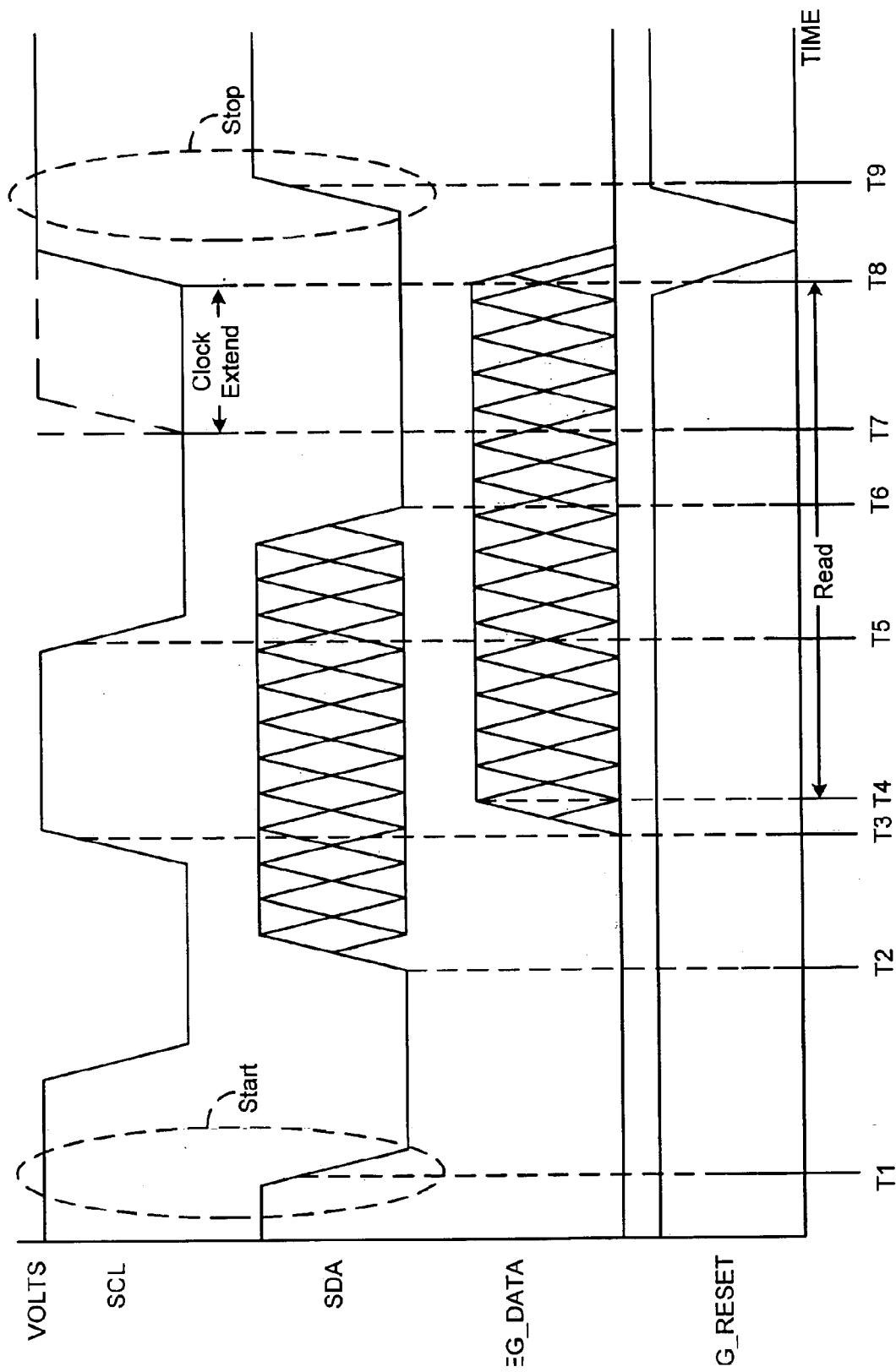
FIG. 4 is a timing diagram illustrating signals used and generated by a Read Data Register/Clock Stretcher included in the computer of FIG. 3.

FIG. 4 is a timing diagram depicting signals on the SCL line 307 and the SDA line 309 during execution of a command (e.g., a read-byte command) issued by a master device (e.g., the network adapter processor 308) on the SDA line 309. Specifically, FIG. 4 depicts a start condition at time T1 comprising a high-to-low logic level transition of the SDA line 309 while the SCL line 307 is at a high logic level (the SCL line 307 is "high"). The start condition at the time T1 indicates the start of the read operation. FIG. 4 also depicts a stop condition at the time T9 comprising a low-to-high logic level transition of the SDA line 309 while the SCL line 307 is high. The stop condition at the time T9 indicates the end of the read operation and the start of an idle condition on the SMBus 306. Moreover, FIG. 4 depicts, between times T2 and T6; at least a portion of a data byte asserted by a slave device responding to the read-byte command on the SDA line 309.

In accordance with the SMBus specification, the data byte portion asserted by the slave device changes state when the SCL line 307 is at a low logic level (the SCL line 307 is "low"), and is stable and valid for the read operation between times T3 and T5 when the SCL line 307 is high. In this illustrative embodiment, the high period of the clock signal on the SCL line 307 between the times T3 and T5 is 4.0 μs, which is the minimum high period of the clock signal according to the SMBus specification. Further, the positive-going transition of the clock signal on the SCL line 307 at the time T3 indicates the start of the stable period of that portion of the data byte on the SDA line 309; and, the negative-going transition of the clock signal at the time T5 indicates the end of the stable period of the data byte and the start of a period during which logic level transitions may occur on the SDA line 309.

In addition, in this illustrative embodiment, the interrupt controller provides an interface for either a master or slave device, e.g., the network adapter processor 308, to interrupt itself at the time T1, which corresponds to the start condition; at the time T9, which corresponds to the stop condition; at the time T3, which corresponds to the positive-going transition of the clock signal indicating the start of the stable period of the data signal on the SDA line 309; and, at the time T5, which corresponds to the negative-going transition of the clock signal indicating the end of the stable period of the data signal on the SDA line 309. It should be noted that in a preferred embodiment, interrupts are generated at each positive-going and negative-going transition of the clock signal on the SCL line 307.

As described above, the host processor 302 executes a power management application for powering-down at least a portion of the computer 300, e.g., when the computer 300 is not in use for an extended time, and for restoring full-power to the computer 300 when it is required for use. In this illustrative embodiment, when the computer 300 is powered-down, i.e., when the computer 300 is sleeping, power is removed from the computer 300 except for that required to maintain the current operational state in memory, and to maintain operation of the network adapter 304. Further, the clock frequency of the network adapter processor 308 is reduced from a normal operating frequency, e.g., 125 MHz, to a reduced frequency, e.g., 5 MHz.

Accordingly, when the network adapter processor 308 is operating at the normal operating frequency of 125 MHz, i.e., when the computer 300 is "awake," five hundred (500) cycles of the clock occur during the 4.0 μs period from T3 to T5, which is when the data asserted by the slave device is stable and valid for completing the read operation. In contrast, when the network adapter processor 308 is operating at the reduced frequency of 5 MHz, i.e., when the computer 300 is sleeping, only twenty (20) cycles of the clock occur during the 4.0 μs period from T3 to T5.

Because there are significantly fewer clock cycles available from T3 to T5 for completing the read operation when the computer 300 is sleeping, the network adapter 304 is provided with the read-data register/clock stretcher 310 to increase the period during which the data asserted by the slave device is stable and valid, thereby increasing the number of clock cycles available to the master device for completing the read operation.

Figure 5:
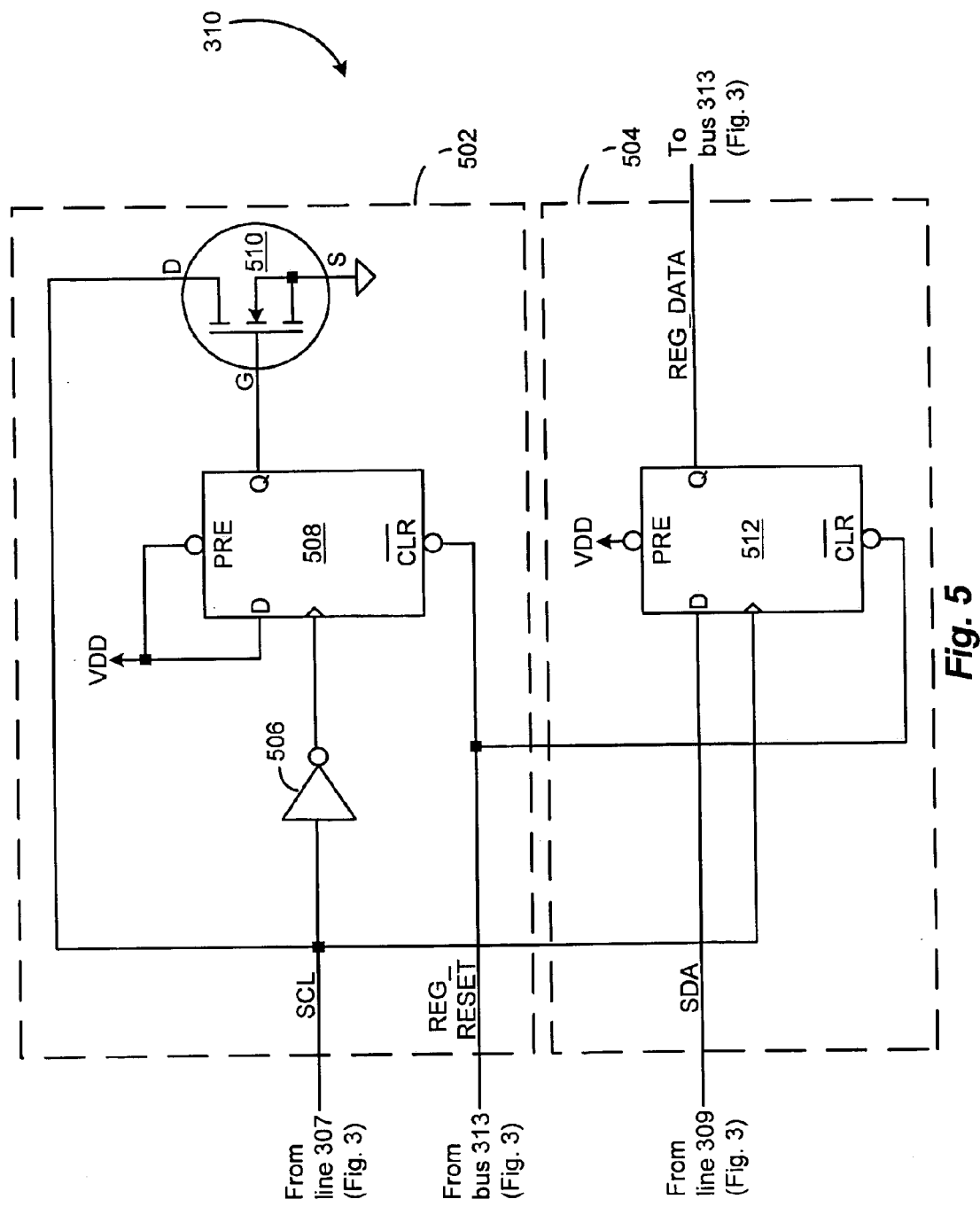
FIG. 5 is a schematic diagram of the Read Data Register/Clock Stretcher depicted in FIG. 3; and FIG. 6a and FIG. 6b is a flow diagram illustrating a method of operation of the computer depicted in FIG. 3 for performing a read operation when the computer is sleeping.

FIG. 5 is a schematic diagram depicting key elements of the read-data register/clock stretcher 310. Specifically, the read-data register/clock stretcher 310 includes a read-data register portion 504 and a clock stretcher portion 502. As explained above, the read-data register 504 is used to increase the period during which the data asserted by the slave device is stable and valid. To that end, the read-data register 504 includes a register 512, which in a preferred embodiment is a type-D flip-flop.

As depicted in FIG. 5, the SDA line 309 is coupled to the D-input; the SCL line 307 is coupled to the clock input; and, the not-preset input of the D flip-flop 512 is tied to a supply voltage, VDD. Further, the bus 313 comprises a REG_RESET line, which is coupled to the clear input of the D flip-flop 512. Accordingly, the network adapter processor 308 provides a reset signal on the REG_RESET line when it is desired to reset the D flip-flop 512. Moreover, a data signal on the REG_DATA line at the Q-output of the D flip-flop 512 comprises a portion of the data byte asserted by the slave device responding to the read-byte command.

The operation of the read-data register 504 will be better understood with reference to an illustrative example, the timing of which is depicted in FIG. 4. After the start condition is asserted at the time T1 using the SCL line 307 and the SDA line 309, a portion (i.e., 1-bit) of the data byte asserted by the slave device responding to the read-byte command appears on the SDA line 309 (i.e., at the D-input of the D flip-flop 512) at the time T2. Next, the clock signal on the SCL line 307 makes a positive-going transition at the time T3. As a result, the data signal on the REG_DATA line at the Q-output of the D flip-flop 512 becomes the same logic level as the data signal at the D-input of the D flip-flop 512. As explained above, the data signal at the D-input of the D flip-flop 512 is stable and valid for the read operation on the SDA line 309 between the times T3 and T5 when the SCL line 307 is high. However, because logic level changes at the D-input of the D flip-flop 512 when the clock signal is low do not affect the Q-output, the registered data at the Q-output, i.e., the data signal on the REG_DATA line, is stable and valid for the read operation beyond the time T5. In this illustrative example, the network adapter processor 308 provides the reset signal on the REG_RESET line at time T8. As a result, the data signal on the REG_DATA line is stable and valid for the read operation from about time T4 to the time T8.

It should be understood that the period during which the data asserted by the slave device is stable and valid, which is increased using the read-data register 504, exceeds the high period of the clock signal on the SCL line 307. In this illustrative example, the increased period during which the data is stable and valid exceeds the minimum high period of the clock signal, i.e., 4 μs. For this reason, the read-data register/clock stretcher 310 includes the clock stretcher portion 502 to synchronize the clock signal on the SCL line 307 with the speed of the device reading the data signal on the REG_DATA line. To that end, the clock stretcher 502 includes a register 508, which in a preferred embodiment is a type-D flip-flop; and, a "pull-down" switch 510, which in a preferred embodiment is a suitable Metal-Oxide Semiconductor Field-Effect Transistor (MOSFET).

As depicted in FIG. 5, the D-input and the not-preset input of the D flip-flop 508 are tied to the supply voltage, VDD. Further, the SCL line 307 is coupled to the not-clock input, and the REG_RESET line is coupled to the clear input of the D flip-flop 508. Moreover, the MOSFET 510 has gate (G), drain (D), and source (S) connections, with the gate connection coupled to the Q-output of the D flip-flop 508, the drain connection coupled to the SCL line 307, and the source connection coupled to ground potential ("ground").

The operation of the clock stretcher 502 will be better understood with reference to the timing diagram of FIG. 4. The clock signal on the SCL line 307 makes a negative-going transition at the time T5. As a result, because the D-input is tied to the supply voltage, VDD, the Q-output of the D flip-flop 508 becomes high at about the time T5. Further, because the high logic level at the Q-output is applied to the gate connection of the MOSFET 510, the MOSFET switch is activated and the SCL line 307 at the drain connection of the MOSFET 510 is connected to or "pulled-down" to ground at about the time T5.

As depicted in phantom in FIG. 4, the clock signal on the SCL line 307 would normally undergo a positive transition at time T7. However, because the D flip-flop 508 and the MOSFET 510 cause the SCL line 307 to be pulled-down to ground at about the time T5, the clock signal on the SCL line 307 remains low through the time T7 until the time T8 when the network adapter processor 308 asserts the reset signal on the REG_RESET line. The assertion of the reset signal at the time T8 causes the Q-output of the D flip-flop 508 to apply a low logic level to the gate connection of the MOSFET 510, thereby deactivating the MOSFET switch to disconnect the SCL line 307 from ground. As a result, the clock signal on the SCL line 307 enters the idle condition at about the time T8.

As depicted in the exemplary timing diagram of FIG. 4, the clock stretcher 502 extends the low period of the clock signal on the SCL line 307 from T7 to T8. In effect, the clock stretcher 502 "stretches" or extends the low period of the clock signal to give a device additional clock cycles during which to complete a read operation, i.e., to read the registered data on the REG_DATA line.

According to the SMBus specification, the clock stretcher 502 starts stretching the low period of the clock signal on the SCL line 307 before the minimum low period of the clock signal, i.e., 4.7 μs, has expired. Further, the network adapter processor 308 releases the clock stretcher 502 to comply with the clock low time-out specification, i.e., 25 to 35 ms, and the cumulative clock low extend time specification, i.e., 25 ms if a slave device is controlling the clock stretcher 502, and 10 ms if a master device is controlling the clock stretcher 502. In one embodiment, the clock stretcher 502 stretches the clock periodically, e.g., on successive bit transfers. In this embodiment, the clock stretcher 502 complies with the minimum SMBus operating frequency, i.e., 10 kHz.

Figure 6A:
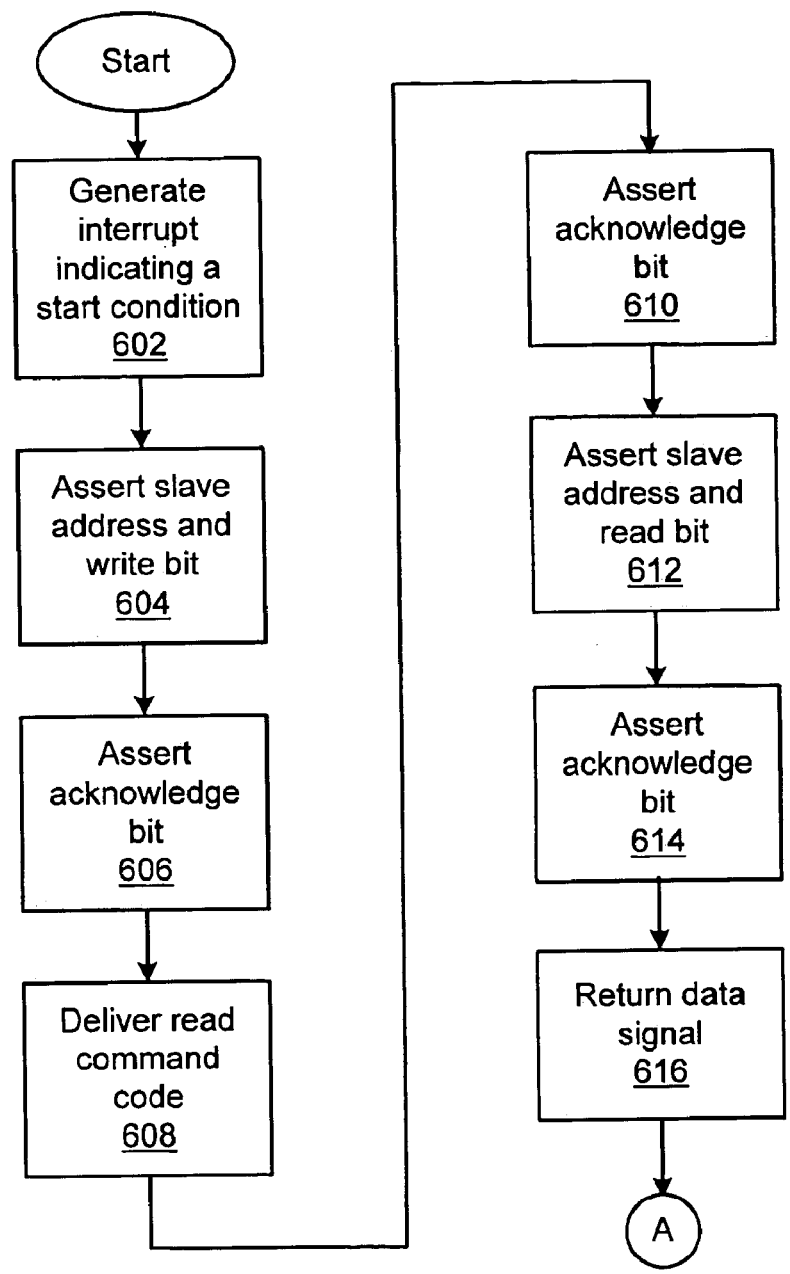
Figure 6B:
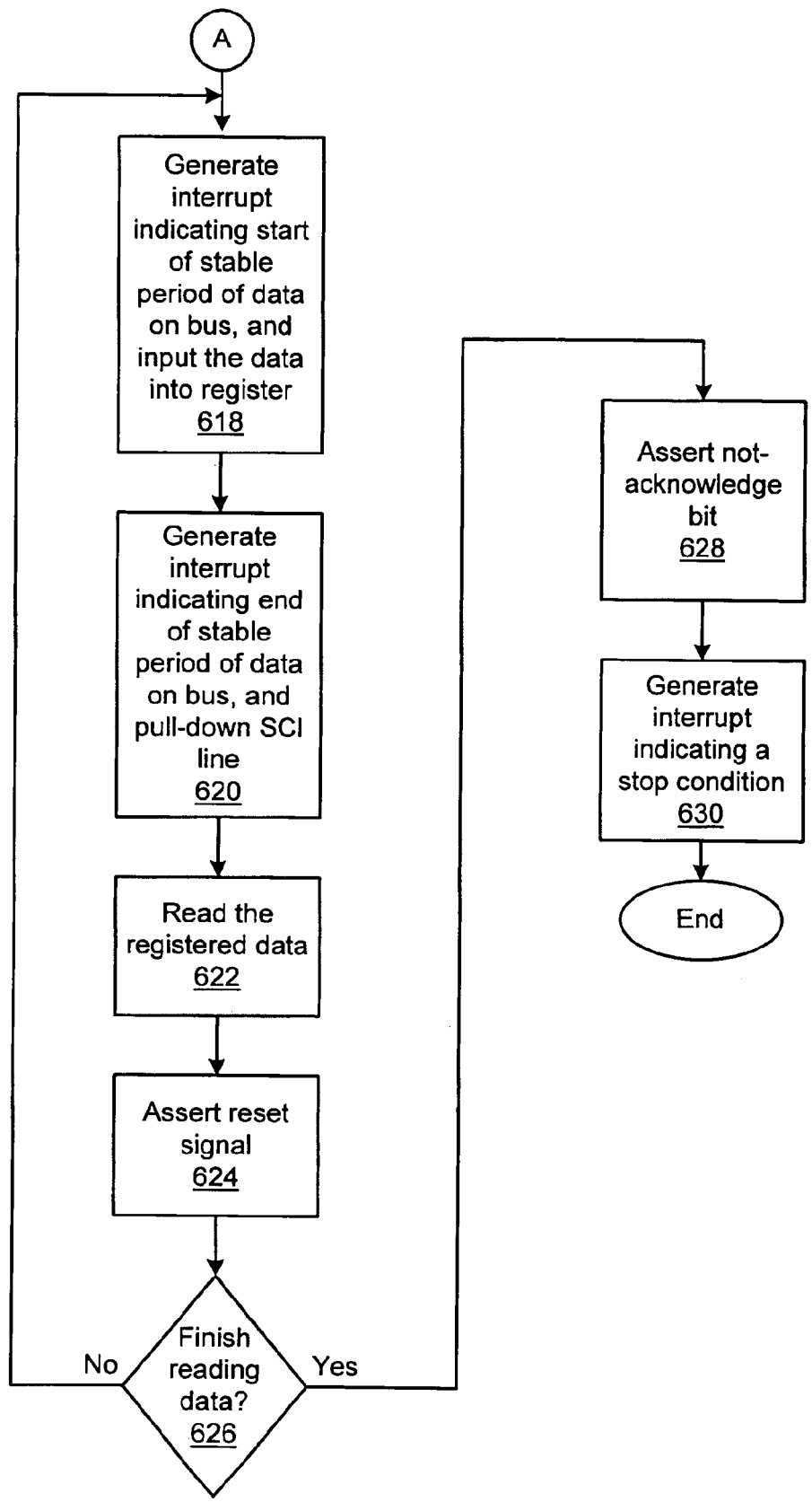

A method of performing a read operation on the SMBus 306 when the computer 300 is sleeping is illustrated by reference to FIG. 6a and FIG. 6b. As depicted in step 602 (see FIG. 6a), an interrupt is generated to indicate a start condition, i.e., the start of the read operation, on the SMBus 306. Next, a master device asserts, as depicted in step 604, the address of a slave device and a write bit on the SMBus 306. The slave device having that address then asserts, as depicted in step 606, an acknowledge bit on the SMBus 306. Next, the master device delivers, as depicted in step 608, a read command code on the SMBus 306. Upon detection of the read command code, the slave device asserts, as depicted in step 610, another acknowledge bit on the SMBus 306. Next, the master device asserts, as depicted in step 612, the address of the slave device and a read bit on the SMBus 306 to denote a read operation from the slave address. The slave device having that address then asserts, as depicted in step 614, still another acknowledge bit on the SMBus 306. Next, the slave device returns, as depicted in step 616, a data signal representing 1 or 2-bytes of data on the SMBus 306. Another interrupt is then generated, as depicted in step 618 (see FIG. 6b), to indicate the start of the stable period of a portion of the data signal, i.e., 1-bit, on the SMBus 306; and, 1-bit of the data signal is input, as also depicted in step 618, into the read-data register 504. Still another interrupt is then generated, as depicted in step 620, to indicate the end of the stable period of the data on the SMBus 306; and, the SCL line 307 is pulled-down to ground, as also depicted in step 620, to extend the low period of the clock signal. The master device then reads, as depicted in step 622, the registered data on the REG_DATA line of the bus 313 at the output of the read-data register 504. Next, the master device asserts, as depicted in step 624, a reset signal on the REG_RESET line of the bus 313 to reset the read-data register 504. Next, a decision is made, as depicted in step 626, as to whether the master device has finished reading the data signal returned by the slave device in step 616 (see FIG. 6a). If so, then the master device asserts, as depicted in step 628, a not-acknowledge bit on the SMBus 306; and, yet another interrupt is then generated, as depicted in step 630, to indicate a stop condition, i.e., the end of the read operation, on the SMBus 306. Otherwise, the method loops back to step 618 to read another bit of the data signal.

Although functions of this illustrative embodiment are illustrated as being software-driven Wand executable out of memory by the network adapter processor 308, the presently described functions may alternatively be embodied in part or in whole using hardware components such as custom or semi-custom integrated circuits including Application Specific Integrated Circuits (ASICs), Programmable Logic Arrays (PLAs), state machines, controllers or other hardware components or devices, or a combination of hardware components and software.

Those of ordinary skill in the art should appreciate that variations to and modification of the above-described systems and techniques may be made without departing from the inventive concepts disclosed herein. Accordingly, the present invention should be viewed as limited solely by the scope and spirit of the appended claims.

What is claimed is:

1. A system for transferring data between a plurality of devices coupled to a bus, at least one of the plurality of devices being operative at a plurality of clock rates, comprising:

a bus including a data line operative to carry data and a clock line operative to carry a clock signal; and first and second devices operatively coupled to the bus, at least the second device including at least one data register, wherein the first and second devices are operative at a first clock rate, and the second device is further operative at a second reduced clock rate, the second reduced clock rate being less than the first clock rate, wherein at least the first device is operative to transmit data over the data line, and wherein the second device is operative to receive at least a portion of the data transmitted over the data line, to store the at least a portion of the data in the data register, and, in the event the first device is operating at the first clock rate and the second device is operating at the second reduced clock rate, to drive the clock line to a predetermined logic level while the data is stored in the data register, thereby enabling data transfer between the first device and the second device over the bus while the second device operates at the second reduced clock rate.

2. The system of claim 1 wherein the second device is further operative at least at the second reduced clock rate to clear the data from the data register upon completion of the data transfer.

3. The system of claim 1 wherein the second device further includes control circuitry for driving the clock line to the predetermined logic level and for releasing the clock line upon completion of the data transfer.

4. A method of transferring data between a plurality of devices coupled to a bus, at least one of the plurality of devices being operative at a plurality of clock rates, comprising the steps of:

providing a bus and first and second devices coupled to the bus, at least the second device including at least one data register, the first and second devices being operative at a first clock rate, the second device being further operative at a second reduced clock rate, the second reduced clock rate being less than the first clock rate, the bus including a data line for carrying data and a clock line for carrying a clock signal;

transmitting data over the data line by the first device;

receiving at least a portion of the data transmitted over the data line by the second device;

storing the at least a portion of the data transmitted over the data line in the data register by the second device; and in the event the first device is operating at the first clock rate and the second device is operating at the second reduced clock rate, driving the clock line to a predetermined logic level while the data is stored in the data register by the second device, thereby enabling data transfer between the first device and the second device over the bus while the second device operates at the second reduced clock rate.

5. The method of claim 4 further including the step of clearing the data from the data register upon completion of the data transfer by the second device, the clearing step being performable by the second device operating at least at the second reduced clock rate.

6. The method of claim 4 wherein the driving step includes driving the clock line to the predetermined logic level by control circuitry included in the second device, and further including the step of releasing the clock line upon completion of the data transfer by the control circuitry within the second device.

* * * * *